US012570169B2

(12) United States Patent
    Loser

(10) Patent No.: US 12,570,169 B2
(45) Date of Patent: Mar. 10, 2026

(54) AXIALLY ROTATABLE CONNECTOR

(71) Applicant: HUBER+SUHNER AG, Herisau (CH)

(72) Inventor: Roger Loser, Uster (CH)

(73) Assignee: HUBER+SUHNER AG, Herisau (CH)

( * ) Notice: Subject to any disclaimer, the term of this patent is extended or adjusted under 35 U.S.C. 154(b) by 852 days.

(21) Appl. No.: 17/860,526

(22) Filed: Jul. 8, 2022

(65) Prior Publication Data

US 2023/0022676 A1    Jan. 26, 2023

(30) Foreign Application Priority Data

Jul. 21, 2021    (DE) ........................ 10 2021 118903.9

(51) Int. Cl.
    B60L 53/16        (2019.01)
    H01R 13/631       (2006.01)
(52) U.S. Cl.
    CPC ............ B60L 53/16 (2019.02); H01R 13/631 (2013.01); H01R 2201/26 (2013.01)
(58) Field of Classification Search
    CPC .... B60L 53/16; H01R 13/631; H01R 2201/26
    USPC ......................................................... 320/109
    See application file for complete search history.

(56) References Cited

U.S. PATENT DOCUMENTS

| | | | | | |
|---|---|---|---|---|---|
| 5,614,808 | A | * | 3/1997 | Konoya | B60L 53/305 |
| | | | | | 320/109 |
| 9,601,885 | B2 | * | 3/2017 | Fransen | H01R 24/64 |

| | | | | | |
|---|---|---|---|---|---|
| 11,718,195 | B2 | * | 8/2023 | Kadoko | B60L 53/35 |
| | | | | | 320/109 |
| 2005/0057223 | A1 | * | 3/2005 | Harada | H02J 7/00 |
| | | | | | 320/128 |
| 2007/0128901 | A1 | * | 6/2007 | Schmidt | H01R 13/6273 |
| | | | | | 439/157 |
| 2009/0191738 | A1 | * | 7/2009 | Kadar-Kallen | H01R 13/5202 |
| | | | | | 439/207 |
| 2010/0273346 | A1 | * | 10/2010 | Mossner | H01R 4/2445 |
| | | | | | 439/404 |

(Continued)

FOREIGN PATENT DOCUMENTS

| | | | | | |
|---|---|---|---|---|---|
| DE | 202005019035 | U1 | * | 5/2007 | ......... H01R 13/6273 |
| DE | 102018116718 | A1 | * | 1/2019 | ......... B60L 11/1818 |

(Continued)

OTHER PUBLICATIONS

German Patent Office, München, Germany, German language version of the Office Action for German Application No. DE 10 2021 118 903.9, Apr. 28, 2022 (12 pages).

*Primary Examiner* — Suresh Memula
(74) *Attorney, Agent, or Firm* — Pauley Erickson & Swanson

(57)                ABSTRACT

An assembly (1) with a charging plug (2) and a charging cable (3) attached thereto for a charging column for charging electric vehicles. The charging cable (3) has a cable sheath (4) and a plurality of conductors (5) movably arranged therein, the charging plug (2) including a plug housing (6) on which plug contacts (8) interconnected to the conductors (5) are arranged at a front end (7). Furthermore, a holder (10), to which the cable sheath (4) of the charging cable (3) is fastened, is arranged at a rear end (9) of the charging plug (2), wherein the holder (10) is arranged rotatably about a longitudinal axis (11) of the plug housing (6) by an angle of rotation (a) relative to the plug housing (6).

16 Claims, 2 Drawing Sheets

(56)         References Cited

U.S. PATENT DOCUMENTS

| | | | | |
|---|---|---|---|---|
| 2012/0161703 A1* | 6/2012 | Gonzalez | ................ | B60L 53/31 |
| | | | | 320/109 |
| 2012/0206100 A1* | 8/2012 | Brown | .................... | B60L 53/18 |
| | | | | 320/109 |
| 2013/0271075 A1* | 10/2013 | Restrepo | .............. | H02J 7/0042 |
| | | | | 320/109 |
| 2013/0320921 A1* | 12/2013 | Muller | ................... | B60L 53/14 |
| | | | | 320/109 |
| 2016/0121747 A1* | 5/2016 | Jefferies | ................. | B60L 53/16 |
| | | | | 320/109 |
| 2016/0159231 A1* | 6/2016 | Jefferies | ................. | B60L 53/60 |
| | | | | 320/109 |
| 2023/0106493 A1* | 4/2023 | Moulik | ................. | H01R 13/60 |
| | | | | 320/109 |
| 2024/0128697 A1* | 4/2024 | Dobler | ................ | H01R 13/516 |

FOREIGN PATENT DOCUMENTS

| | | | |
|---|---|---|---|
| DE | 102018112746 A1 * | 11/2019 |
| EP | 3 411 883 A0 | 12/2018 |
| JP | 2016-201326 A | 12/2016 |
| JP | 2017-10734 A | 8/2018 |
| WO | WO 2017/133893 A1 | 8/2017 |

* cited by examiner

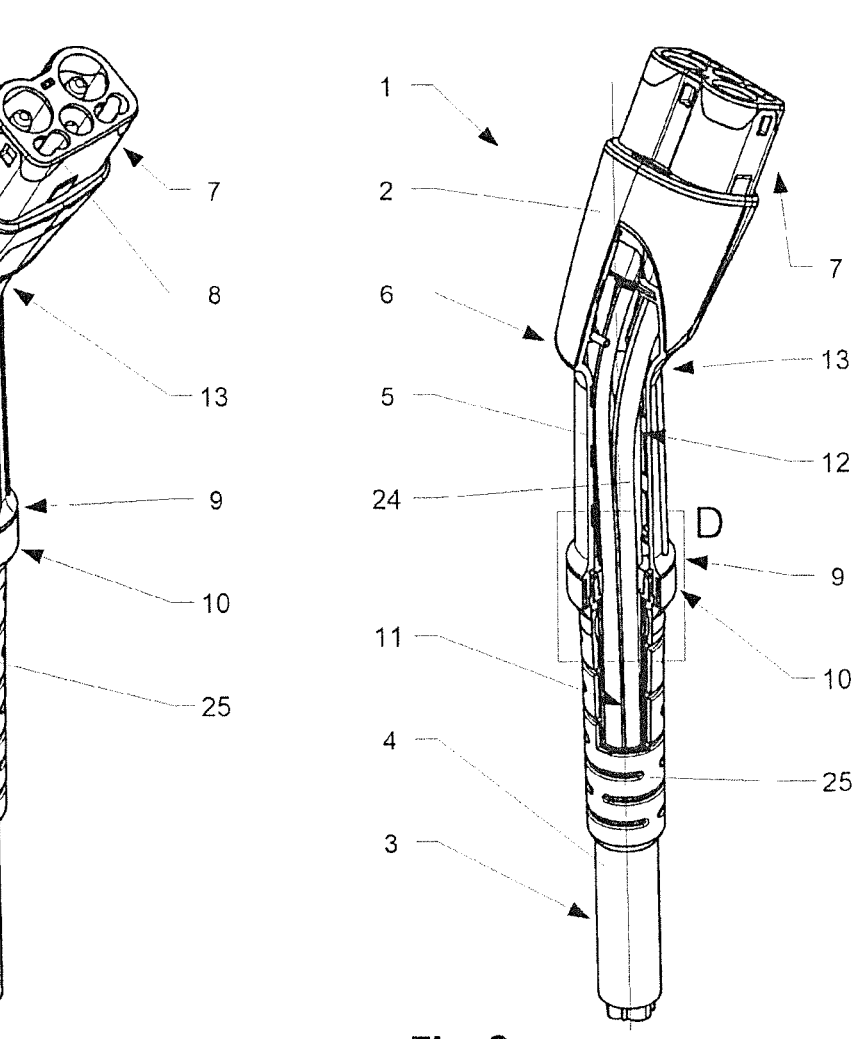
Fig. 1
Fig. 2
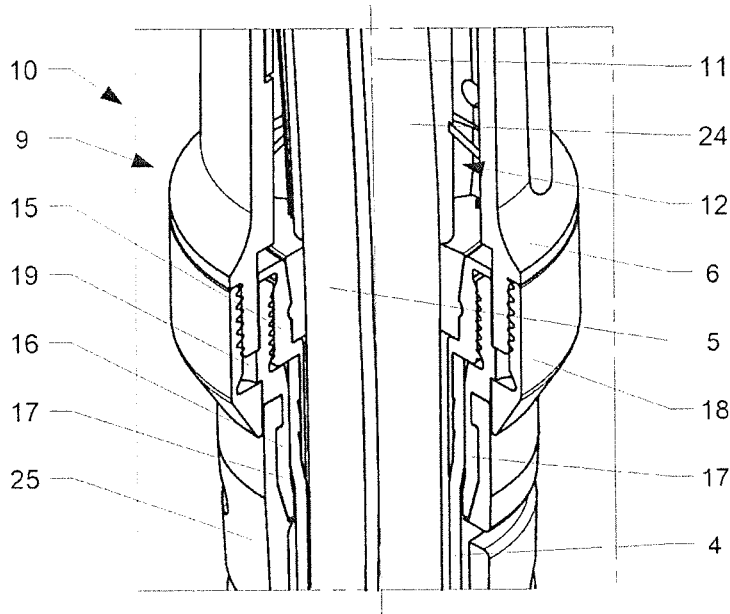
Fig. 3

AXIALLY ROTATABLE CONNECTOR

CROSS-REFERENCE TO RELATED APPLICATION

German Patent Application No. DE 10 2021 118903.9, filed 21 Jul. 2021, the priority document corresponding to this invention, to which a foreign priority benefit is claimed under Title 35, United States Code, Section 119, and its entire teachings are incorporated, by reference, into this specification.

BACKGROUND OF THE INVENTION

Field of the Invention

The present disclosure is in the field of charging plugs and charging cables for a powerful battery charging point for charging electric vehicles.

Discussion of Related Art

In battery charging points known from the state of the art, the user usually has to make a 180° twisting movement of the charging plug when removing the charging plug from the battery charging point and inserting it into the vehicle. As the charging cable is very rigid due to the power and signal cables, cooling lines and any mechanical protective elements it contains, it cannot be dynamically twisted without restriction. The relatively torsionally stiff charging cable resists the twisting movement and the insertion of the charging plug into the vehicle becomes an effort for the user. This is a particular problem with the electric charging cables currently in use, which usually have a diameter of up to 25-40 mm. Especially at low outside temperatures, the cable material is also much stiffer and further exacerbates this problem.

EP3411883A1 of the applicant, which was published on 12 Dec. 2018, shows a cable arrangement comprising a cable with a cable conduit and at least one conductor arranged therein. The cable conduit is spaced from the conductor and forms a first gap between the at least one conductor and the cable conduit. At least one tube for conveying a cooling fluid and a connector comprising at least one contact element connected to the at least one conductor and a chamber comprising a first opening connected to the first gap between the at least one conductor and the cable conduit and a second opening connected to the at least one tube.

DE102018112746 of the applicant, which was published on 28 Nov. 2019, shows a charging station for an electric vehicle with a base, a plug with plug contacts for plugging into a compatible socket on the electric vehicle, and a bendable cable which is attached to the base with a first end and is attached to the plug with a second end of the cable opposite the first. The plug is movable between a parking position and a charging position. The plug contacts of the plug point in the same spatial direction in the parking position and in the charging position. The cable and/or the plug have an internal cooling system interconnected to the base.

SUMMARY OF THE INVENTION

One objective of the disclosure can be seen in, among others, reducing the effort required by the user when plugging the charging cable into the electric vehicle.

An already known possibility to reduce the effort is to arrange the connection between the charging cable and the charging plug so that it can rotate freely, as it is known from gas pump nozzles for mineral fuels. However, unlimited rotatability of the charging plug in the circumferential direction of the charging cable requires sliding contacts at the transition between the charging cable and the charging plug, which cannot be easily realized with the high currents currently in use and would also only have a limited service life. In addition, with cooled charging cables, the lines for the cooling medium would also have to be designed rotatable, which takes up a lot of space and further complicates the design. Such complicated charging plugs are also susceptible to damage, for example by falling.

A charging plug and a thereto connected charging cable advantageously form an assembly for a battery charging point for charging electric vehicles. The design, which is explained in more detail below, makes it possible to reduce the amount of force required to turn the charging plug in the circumferential direction relative to the charging cable. This already makes the insertion process of the charging plug much easier for the user, but does not require any problematic sliding contacts. The assembly according to the disclosure generally comprises a charging plug and a charging cable attached thereto for a battery charging point for charging electric vehicles. The charging cable has a cable sheath and several conductors arranged movably therein. Depending on the electrical power to be transmitted, the cable sheath may comprise one or more conductors arranged movably therein. In a preferred variation, the cable sheath is spaced apart from the at least one conductor in order to achieve mechanical decoupling between the at least one conductor and the cable sheath. The cavity between the at least one conductor and the cable sheath enables a better torsional flexibility of the at least one conductor because they do not strongly influence each other. The cavity between the at least one conductor and the cable sheath can be used to conduct a cooling medium through the cable sheath, which circulates around the conductor in the circumferential direction, at least in certain areas, and cools it in the process.

The charging plug further comprises a plug housing on which plug contacts are arranged at a front end that are interconnected to the conductors. Preferably, the plug housing comprises a plug module, which can be interconnected to a corresponding socket at the electric vehicle for the actual charging process. In a preferred variation, the plug contacts are arranged on the plug module and are interconnected to the several conductors arranged movably in the plug housing. The plug housing of the charging plug and/or the cable sheath preferably have a cavity in which the multiple conductors can move relative to each other. Due to the extensive decoupling, this enables better torsion of the several conductors and, if present, the cooling line and thus a reduced effort for the user when plugging into the socket on the electric vehicle. Alternatively, or additionally, the assembly can comprise one or more cooling lines for cooling the plug contacts and/or the electrical conductors. The several conductors arranged movably in the charging plug and, if applicable, the cooling line, are advantageously arranged freely movable in the plug housing and the cable sheath. In a preferred variant, the plug housing comprises two half-shells which at least partially enclose the cavity in the assembled state. The connector housing is advantageously divided into two half-shells along the longitudinal axis. In the assembled state, the two half-shells can be interconnected to each other, for example by means of a tongue and groove or snap-in connection. The two half-shells can also be additionally screwed to the connector module. A multi-part design of the connector housing makes it possible to replace only individual components in a repair case. The multi-part design of the plug housing also has the advantage that such a design allows good access to the interior of the charging plug during assembly or for maintenance purposes. Thus, the several movably arranged conductors and, if applicable, the cooling line can be interconnected to the plug contacts at the front end of the plug housing before the half shells are mounted and close the cavity. The cavity of the plug housing may have a bend along the longitudinal axis. The connector housing preferably has a substantially cylindrical portion in the rear region, which serves as a handle for the user. The essentially cylindrical section may have elevations and/or depressions in the form of grooves, which preferably run along the longitudinal axis of the plug housing. The elevations and/or recesses enable a better grip for the user and thus serve to improve the ergonomics of the charging plug. For easier insertion of the charging plug into the corresponding socket of the electric vehicle, the front end of the charging plug may be inclined with respect to the longitudinal axis of the plug housing. Good results can be achieved if the front end is inclined in a range of 15° to 45° with respect to the longitudinal axis of the plug housing.

In a preferred variation, the connector housing comprises a skeletonized base on the inside and/or replaceable elements which are attachable to the connector housing. The skeletonized base can increase the stability of the plug housing. Alternatively, or additionally, the plug housing may also have a ribbed structure. The ribs may be arranged in the area of the replaceable elements and/or on the inner sides of the connector housing. The ribbed structure can further increase the stability of the plug housing. Preferably, the replaceable elements are made wholly or partly of an impact-resistant material. In a preferred variation, the connector housing and/or the connector module comprises one or more pads of impact-resistant material, which can be attached to the connector housing at the front end of the connector housing on the outside. The outside is to be understood as the side of the plug housing facing the environment. In case of a fall of the charging plug, the replaceable elements can absorb part of the energy and thus reduce or even avoid damage, especially to the plug housing. Due to wear or for aesthetic reasons, the replaceable elements are preferably connected to the plug housing in such a way that they can also be easily replaced on site at the assembly's place of use.

A holder is arranged at the rear end of the charging plug, to which the cable sheath of the charging cable is attached. The holder is arranged so that it can be rotated about a longitudinal axis of the plug housing by an angle of rotation relative to the plug housing. Good results can be achieved if the angle of rotation (a) is limited to +/−60°. With a rotation angle of +/−60°, sufficient rotation of the charging plug with respect to the charging cable is made possible during operation without excessive torsion of the conductors movably arranged in the cable sheath and/or charging plug. This allows the force level to be lowered. Preferably, the ratio of cable length to cable diameter should not be less than 50:1, such that the conductors arranged movably in the cable sheath can twist sufficiently during the rotary movement without being overstressed. With a maximum angle of rotation of +/−60° and a ratio of cable length to cable diameter of at least 50:1, the alternating bending load is such that a service life of typically 15,000 charging/plugging operations of the cable can be achieved. Good results can be achieved with a free length of the charging cable between battery charging point and charging plug of essentially 3000 mm, with an outer diameter of the cable sheath of 30-35 mm. The orientation of the charging cable and/or the charging plug in the battery charging point should be according to the preferred charging position of the vehicle. Good results can be achieved if the center position of the plug points towards the vehicle. For this purpose, a mark for the turning position can be placed on the plug housing to simplify the optimal installation. In addition to the holder on the connector housing, the connection of the charging cable to the battery charging point can also be designed as a cable gland that can be rotated at least in some areas in the circumferential direction. This can further improve the rotatability of the assembly.

The holder of the charging plug can have a sleeve-shaped base, which is interconnected to the cable sheath in the assembled state. In a preferred variation, the sleeve-shaped base can have a cylindrical holding surface onto which the cable sheath of the charging cable is pushed. The cylindrical holding surface can have a chamfer at a first end facing away from the connector housing, which serves to facilitate pushing the cable sheath onto the cylindrical holding surface. At a second end facing the connector housing, the sleeve-shaped base can have a collar that at least partially surrounds it in the circumferential direction. Preferably, the cable sheath is fixed in a secure position relative to the sleeve-shaped base by means of a first holding means. For this purpose, the at least partially circumferential collar of the sleeve-shaped base can have an external thread which is configured to be interconnected to a corresponding internal thread on the first holding means. Furthermore, the at least partially circumferential collar of the sleeve-shaped base can have a stop in the longitudinal axis, which serves to limit the angle of rotation $\alpha$. In a preferred variation, the first holding means comprises a clamping element with which the cable sheath is firmly clamped relative to the sleeve-shaped base. Preferably, the clamping element is designed as a cylindrical clamping surface. In the assembled state, the cable sheath is preferably clamped between the cylindrical holding surface of the sleeve-shaped base and the cylindrical clamping surface of the first holding means. Good results can be achieved if the retainer is interconnected to the rear end of the connector housing by means of a second holding means. In a preferred variation, the second holding means is a gland nut or a connecting element that engages in a groove at the connector housing. For maintenance or repair purposes, it is advantageous if the second holding means can be dismantled on site. At the same time, however, unintentional removal in the form of vandalism should be made more difficult. In a preferred variation, the second holding means can be designed for this purpose as a gland nut which has a substantially smooth cylindrical outer contour. A gland nut shaped in this way does not provide any attachment points for conventional tools, such as an open-end wrench. A gland nut also makes it possible to achieve the most compact possible size of the holder.

In a preferred variation, the second holding means can be arranged at least partially above the first holding means with respect to the longitudinal axis. Preferably, the second holding means is designed as a union nut which is screwed to the rear end of the connector housing in the assembled state. The first holding means can comprise a circumferential collar by means of which the first holding means is interconnected to the second holding means in a rotationally movable manner in the assembled state. Good results can be achieved if the second holding means is designed as a union
nut and has a cylindrical receiving space in which the
circumferential collar of the first holding means is received.
By receiving the circumferential collar of the first holding
means, it can be prevented that the first holding means with
the sleeve-shaped base interconnected thereto can slip unin-
tentionally with respect to the longitudinal axis in the
mounted state. In a preferred variation, the circumferential
collar of the base comes to rest with a first side on the rear
end of the connector housing in the assembled state and
simultaneously comes to rest with a second side on a stop in
the gland nut. On the one hand, this prevents unintentional
slipping along the longitudinal axis, but on the other hand,
it enables the desired rotation in the circumferential direc-
tion with respect to the longitudinal axis.

A stop can be arranged on the connector housing and/or
the holder, which limits the angle of rotation (α). The stop
can be in the form of at least one lug which extends in the
direction of the longitudinal axis away from the circumfer-
ential collar of the sleeve-shaped base in the direction of the
plug housing. In the assembled state, the at least one lug can
preferably engage in a corresponding groove at the rear end
of the plug housing. A strain relief element can be arranged
on the holder or the plug housing, by means of which the
charging plug is interconnected to the battery charging point
by means of a tension member running in the charging cable
in order to protect the cable from damage. In a preferred
variation, the strain relief element is designed as an insert
that is interconnected to the sleeve-shaped base. For this
purpose, the insert can be inserted into grooves which are
made in the circumferential collar of the sleeve-shaped base.
Alternatively, or additionally, the strain relief element can
also have retaining webs which engage by means of spring
tongues in a corresponding recess on or in the sleeve-shaped
base. Alternatively, or additionally, a strain relief element
can be attached directly to the conductors. In this case, a
crimping element is preferably positively connected to the
conductor, which crimping element is held securely in
position with respect to the connector housing by means of
a clamping element. The advantage of such a strain relief is
that no tension member such as a cable is required. The
strain relief takes place directly via at least one of the
conductors.

The mount may comprise a cable kink protector that
encompasses the charging cable and extends along the
charging cable away from the rear end of the connector
housing. The cable kink protector is typically made of a soft
elastic material and is substantially cylindrical in shape. In
a preferred embodiment, the cable kink protector is inter-
connected to the holder. It serves to prevent kinking of the
cable sheath and the several movable conductors arranged
therein and thus to prevent damage to the charging cable and
the conductors and/or cooling line arranged movably
therein.

BRIEF DESCRIPTION OF SEVERAL VIEWS OF
THE DRAWINGS

Aspects of the disclosure are explained in more detail
with reference to the examples of embodiments shown in the
following figures and the accompanying description.

FIG. 1 shows a perspective view of the front side of a
variation of the assembly with the charging plug and the
charging cable attached to it;

FIG. 2 shows a perspective view of the rear side of the
assembly according to FIG. 1 of the charging plug and the
charging cable attached to it with a partial section;

FIG. 3 shows a detailed view of the holder of the assembly
according to FIG. 2;

Figures 4, 5:
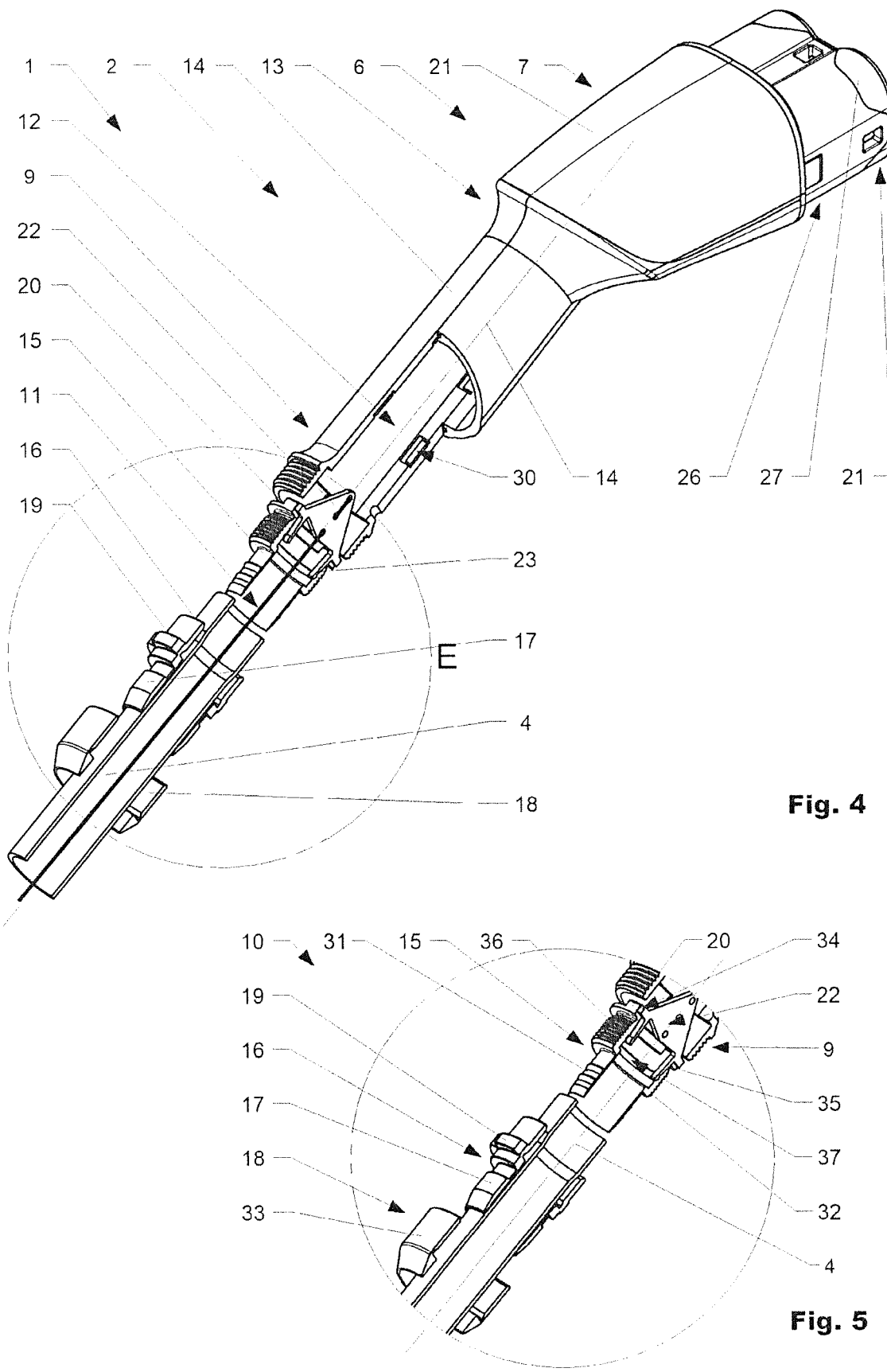
FIG. 4 shows an exploded view of the assembly shown in
FIG. 1 of the charging plug and the charging cable attached
to it with a partial section.
FIG. 5 shows a detailed view of the holder of the assembly
according to FIG. 4.

DESCRIPTION OF PREFERRED
EMBODIMENTS

FIG. 1 shows a perspective view of the front of a variation
of the assembly 1 with the charging plug 2 and the charging
cable 3 attached to it. FIG. 2 shows a perspective view of the
rear of the assembly 1 according to FIG. 1 of the charging
plug 2 and the charging cable 3 attached to it with a partial
section. FIG. 3 shows a detailed view of the holder 10 of the
assembly according to FIG. 2. FIG. 4 shows an exploded
view of the assembly 1 according to FIG. 1 of the charging
plug 2 and the charging cable 3 attached thereto with a
longitudinal section. FIG. 5 shows a detailed view of the
holder 10 of the assembly 1 according to FIG. 4.

FIG. 1 shows a variation of the assembly 1 with a
charging plug 2 and a charging cable 3 attached to it for a
battery charging point for charging electric vehicles. The
charging cable 3 shown comprises a cable sheath 4 and
several conductors 5 movably arranged therein. The shown
charging plug 2 comprises a plug housing 6, with plug
contacts 8 arranged at the front end 7 which are intercon-
nected to the conductors 5, and a holder 10 which is arranged
at the rear end 9, to which holder 10 the cable sheath 4 of
the charging cable 3 is attached. The shown holder 10 is
arranged so as to be rotatable about a longitudinal axis 11 of
the plug housing 6 by an angle of rotation α relative to the
plug housing 6. The cavity 12 of the plug housing 6 of the
variation of the assembly 1 shown has a bend 13 along the
longitudinal axis 11. The plug housing 6 shown also has a
substantially cylindrical portion which serves as a handle 28
for the user. The handle 28 has protrusions 29 which extend
along the longitudinal axis 11 of the connector housing 6.
The elevations 29 shown allow a better grip for the user and
thus serve to improve the ergonomics of the charging plug
2. The bend 13 of the plug housing 6 is located between the
handle 28 of the plug housing 6 and the front end 7 of the
plug housing 6 in the shown variation. The shown assembly
1 comprises a cable kink protector 25 that wraps around the
charging cable 3 and extends along the charging cable 3
away from the rear end 9 of the plug housing 6. The cable
kink protector 25 shown is made of a soft resilient material
and is substantially cylindrical in shape. In the shown
variation, the cable kink protector 25 is interconnected to the
holder 10. It serves to prevent kinking of the cable sheath 4
and the several movable conductors 5 arranged therein and
thus to prevent damage to the charging cable 3 and the
conductors 5 arranged movably therein and/or the cooling
line 24.

FIG. 2 shows that the plug housing 6 of the charging plug
2 and/or the cable sheath of the shown variation of the
assembly 1 comprises a cavity 12 in which the several
movably arranged conductors 5 can move relative to each
other. The charging plug 2 of the variation of assembly 1
shown has at least one cooling line 24 for cooling the plug
contacts 8. The holder 10 of the shown variation of the
assembly 1 comprises a cable kink protection 25 which runs
around the charging cable 3 and extends along the charging
cable 3 away from the rear end 9 of the plug housing 6. As
can be seen from FIG. 2, the charging cable 3 of the shown variation comprises a cable sheath 4 and a plurality of conductors 5 movably arranged therein. The cable sheath 4 of the shown variation is spaced away from the plurality of conductors 5 arranged movably therein to form a cavity 12 between the plurality of conductors 5 and the cable sheath 4. The cavity 12 between the plurality of conductors 5 and the cable sheath 4 enables better torsion of the plurality of conductors 5. The cavity 12 between the plurality of conductors 5 and the cable sheath 4 can also serve to guide a cooling medium through the cable sheath 4, which circulates around the plurality of conductors 5 in the circumferential direction, at least in some areas, and thereby cools the plurality of conductors 5 and/or cools the charging connector 2 as a whole.

FIG. 3 shows that the holder 10 of the shown variation of the assembly 1 has a sleeve-shaped base 15 which, in the assembled state, is interconnected to the cable sheath. The cable sheath 4 of the shown variation of the assembly 1 is fixed in a secure position relative to the sleeve-shaped base 15 by means of a first holding means 16. The first holding means 16 of the variation of the assembly 1 shown comprises a clamping element 17 with which the cable sheath 4 is clamped tightly with respect to the sleeve-shaped base 15. The sleeve-shaped base 15 and the first holding means 16 of the variation of the shown assembly 1, which is interconnected thereto, are interconnected to the rear end 9 of the connector housing 6 by means of a second holding means 18. The second holding means 18 of the variation of assembly 1 shown is a gland nut or alternatively a connecting element engaging in a groove on the plug housing. The first holding means 16 of the variation of assembly 1 shown comprises a circumferential collar 19 by means of which the first 16 is interconnected to the second 18 holding means in a rotationally movable manner in the assembled state. The second holding means 18 of the variation of assembly 1 shown is arranged above the first holding means 16 in relation to the longitudinal axis 11, at least in certain areas.

FIG. 4 shows that the connector housing 6 of the variation of assembly 1 shown comprises two half-shells 14, which at least partially enclose the cavity 12 in the assembled state. A stop 20 is arranged between the plug housing 6 of the shown variation of the assembly 1 and the holder 10, which limits the angle of rotation α. The connector housing 6 of the shown variation of the assembly 1 comprises inside a skeletonized base and/or replaceable elements 21, which can be attached to the connector housing 6 and/or the connector module 26. A strain relief element 22 is arranged on the holder 10 or the plug housing 6 of the variation of assembly 1 shown, by means of which the charging plug 2 is interconnected to the charging pole by means of a tension member 23 running in the charging cable 3 in order to protect the cable from damage due to excessive tension loads. In the variation shown, the plug housing 6 is divided into two half-shells 14 along the longitudinal axis 11. In the assembled state, the two half-shells 14 are interconnected to each other by means of snap-in connections 30. The two half-shells 14 shown are also each screwed to the connector module 26. A multi-part construction of the connector housing 6 makes it possible to replace only individual components in case of repair. The cavity 12 of the plug housing 6 shown has a bend 13 along the longitudinal axis. To facilitate insertion of the charging plug 2 into the corresponding socket of the electric vehicle, the front end 7 of the shown charging plug 2 is inclined with respect to the longitudinal axis 11 of the plug housing 6. In the shown variation, the plug module 26 has replaceable elements 21 which are preferably made of an impact-resistant material. In the shown variation, the plug housing 6 comprises several pads 27 made of an impact-resistant material, which are arranged at the front end 7 of the plug housing 6 on the outside on the plug housing 6 and on the plug module 26.

FIG. 5 shows that the sleeve-shaped base 15 of the shown variation has a cylindrical holding surface 31 onto which the cable sheath 4 of the charging cable 3 is pushed. The cylindrical holding surface 31 shown has a chamfer at a first end facing away from the connector housing, which serves to facilitate pushing the cable sheath 4 onto the cylindrical holding surface 31. At a second end facing the connector housing, the shown sleeve-shaped base 15 has an at least partially circumferential collar 32. The at least partially circumferential collar 32 of the sleeve-shaped base 15 has an external thread which is configured to be interconnected to a corresponding internal thread on the first holding means 16. The at least partially circumferential collar 32 of the sleeve-shaped base 15 has a stop 20 in the direction of the longitudinal axis 11, which serves to limit the angle of rotation α. In the variation shown, the clamping element 17 of the first holding means 16 shown is designed as a cylindrical clamping surface. In the assembled state, the cable sheath 4 is clamped between the cylindrical holding surface 31 of the sleeve-shaped base 15 and the clamping element 17 of the first holding means 16. The holder 10 shown is interconnected to the rear end 9 of the connector housing 6 by means of a second holding means 18. In the variation shown, the second holding means 18 is designed as a gland nut 33. The gland nut 33 shown has a substantially smooth, cylindrical outer contour. A gland nut 33 shaped in this way does not provide any attachment points for conventional tools. For maintenance or repair purposes, the second holding means 18 designed as a gland nut 33 can be dismantled on site. At the same time, however, unintentional removal in the form of vandalism is made more difficult. A gland nut 33 also makes it possible to achieve the most compact possible size of the retainer 10. The stop 20 shown is in the form of lugs, which extend in the direction of the longitudinal axis 11 away from the circumferential collar 32 of the sleeve-shaped base 15 towards the connector housing 6. In the assembled state, the shown stop 20 engages in corresponding grooves at the rear end 9 of the plug housing 6. In the shown variation, a strain relief element 22 is arranged at the holder 10 by means of which the charging plug 2 is interconnected to the charging pole by means of a tension member running in the charging cable in order to protect the cable from damage. The strain relief element 22 shown is interconnected to the sleeve-shaped base 15. The strain relief element 22 is inserted into grooves 34, which are made in the circumferential collar 32 of the sleeve-shaped base 15. In addition, the strain relief element 22 shown also has retaining webs 35 which engage by means of spring tongues 36 in a corresponding recess 37 in the sleeve-shaped base 15.

The invention claimed is:

1. An assembly (1) with a charging plug (2) and an attachable charging cable (3) for a battery charging point for charging electric vehicles, the assembly (1) comprising:
   a. wherein the charging cable (3) comprises a cable sheath (4) and a plurality of therein movably arranged conductors (5);
   b. wherein the charging plug (2) comprises a plug housing (6),
      i. at a front end (7) plug contacts (8) are arranged interconnected to the conductors (5), and
      ii. to which a holder (10) is arranged at a rear end (9), to which the cable sheath (4) of the charging cable (3) is attached, wherein the plug housing (6) of the charging plug (2) and/or the cable sheath include a cavity (12) in which the plurality of movably arranged conductors (5) can move relative to one another; and c. wherein the holder (10) is arranged rotatably about a longitudinal axis (11) of the connector housing (6) by a rotation angle (a) relative to the connector housing (6).

2. The assembly (1) according to claim 1, wherein the cavity (12) of the connector housing (6) includes a bend (12) along the longitudinal axis (11).

3. The assembly (1) according to claim 1, wherein the connector housing (6) comprises a skeletonized base on the inside and/or replaceable elements (21) which are attachable to the connector housing (6).

4. The assembly (1) according to claim 1, wherein the charging cable (3) comprises at least one cooling line (24) for cooling the plug contacts (8) and/or the electrical conductors (5).

5. The assembly (1) according to claim 1, wherein the holder (10) comprises a cable kink protector (25) which runs around the charging cable (3) and extends along the charging cable (3) away from the rear end (9) of the connector housing (6).

6. An assembly (1) with a charging plug (2) and an attachable charging cable (3) for a battery charging point for charging electric vehicles, the assembly (1) comprising:

a. wherein the charging cable (3) comprises a cable sheath (4) and a plurality of therein movably arranged conductors (5);

b. wherein the charging plug (2) comprises a plug housing (6), i. at a front end (7) plug contacts (8) are arranged interconnected to the conductors (5), and ii. to which a holder (10) is arranged at a rear end (9), to which the cable sheath (4) of the charging cable (3) is attached, wherein the plug housing (6) of the charging plug (2) and/or the cable sheath include a cavity (12) in which the plurality of movably arranged conductors (5) can move relative to one another, wherein the connector housing (6) comprises two half-shells (14) which, in the assembled state, at least partially enclose the cavity (12); and c. wherein the holder (10) is arranged rotatably about a longitudinal axis (11) of the connector housing (6) by a rotation angle (a) relative to the connector housing (6).

7. An assembly (1) with a charging plug (2) and an attachable charging cable (3) for a battery charging point for charging electric vehicles, the assembly (1) comprising:

a. wherein the charging cable (3) comprises a cable sheath (4) and a plurality of therein movably arranged conductors (5);

b. wherein the charging plug (2) comprises a plug housing (6), i. at a front end (7) plug contacts (8) are arranged interconnected to the conductors (5), and ii. to which a holder (10) is arranged at a rear end (9), to which the cable sheath (4) of the charging cable (3) is attached;

c. wherein the holder (10) is arranged rotatably about a longitudinal axis (11) of the connector housing (6) by a rotation angle (a) relative to the connector housing (6), wherein the holder (10) includes a sleeve-shaped base (15) which, in the assembled state, is inter-connected to the cable sheath (4).

8. The assembly (1) according to claim 7, wherein the plug housing (6) of the charging plug (2) and/or the cable sheath include a cavity (12) in which the plurality of movably arranged conductors (5) can move relative to one another.

9. The assembly (1) according to claim 7, wherein the cable sheath (4) is fixed in a positionally secure manner relative to the sleeve-shaped base (15) by a first holding means (16).

10. The assembly (1) according to claim 9, wherein the first holding means (16) comprises a clamping element (17) with which the cable sheath (4) is clamped relative to the sleeve-shaped base (15).

11. The assembly (1) according to claim 9, wherein the holder (10) is interconnected to the rear end (9) of the plug housing (6) by means of a second holding means (18).

12. The assembly (1) according to claim 11, wherein the second holding means (18) comprises a gland nut or a connecting element engaging in a groove at the connector housing.

13. The assembly (1) according to claim 11, wherein the first holding means (16) comprises a collar (19) extending in circumferential direction by which the first holding means (16) is interconnected to the second holding means (18) in a rotatable manner in the assembled state.

14. The assembly (1) according to claim 11, wherein the second holding means (18) is arranged at least partially above the first holding means (16) with respect to the longitudinal axis (11).

15. The assembly (1) according to claim 11, wherein a stop (20) is arranged on the plug housing (6) and/or the holder (10) which limits the angle of rotation (a).

16. An assembly (1) with a charging plug (2) and an attachable charging cable (3) for a battery charging point for charging electric vehicles, the assembly (1) comprising:

a. wherein the charging cable (3) comprises a cable sheath (4) and a plurality of therein movably arranged conductors (5);

b. wherein the charging plug (2) comprises a plug housing (6), i. at a front end (7) plug contacts (8) are arranged interconnected to the conductors (5), and ii. to which a holder (10) is arranged at a rear end (9), to which the cable sheath (4) of the charging cable (3) is attached;

c. wherein the holder (10) is arranged rotatably about a longitudinal axis (11) of the connector housing (6) by a rotation angle (a) relative to the connector housing (6), wherein a strain relief element (22) is arranged at the holder (10) or at the plug housing (6), by which the charging plug (2) is interconnected to the battery charging point by a tension member (23) running in the charging cable (3) to protect the cable from damage.

* * * * *